Patented Apr. 30, 1935

1,999,620

UNITED STATES PATENT OFFICE 1,999,620

PROCESS FOR THE MANUFACTURE OF ALCOHOLS

Adrianus Johannes van Peski and Siegfried Leonard Langedijk, Amsterdam, Netherlands, assignors, by mesne assignments, to Shell Development Company, San Francisco, Calif., a corporation of Delaware No Drawing. Application May 17, 1930, Serial No. 453,403. In Great Britain May 23, 1929

8 Claims. (Cl. 260—156)

Our invention relates to a process for the manufacture of alcohols by converting olefines into the corresponding alcohols by means of water.

It is already known to prepare ethyl alcohol by combining ethylene with water according to the equation:

$$C_2H_4 + H_2O \rightarrow C_2H_5OH$$

It is also known to perform the aforesaid reaction in the liquid phase by absorbing the olefine in sulphuric acid and thereafter converting the sulphuric ester obtained into alcohol. It has further been proposed to carry out the hydration process mentioned above in the vapour phase under high pressure and in the presence of catalysts.

We have now found that the hydration of olefines may be effected even at ordinary pressure and with satisfying yields, if the reactions are carried out in the presence of certain catalysts.

According to our invention the hydration process is effected at a temperature of at least 100° C. by combining one or more olefines with water in the vapour state in the presence of a metal or metal compounds, preferably a metal of the platinum group or gold, silver, copper, iron, nickel, cobalt, chromium, tantalum, vanadium, tungsten, or salts or other compounds thereof. Particularly suitable for the purpose set forth are the compounds which under the conditions of the reaction yield the metals, for instance oxalates, carbonyls and the like. Furthermore metal salts of weak inorganic acids may often be used to great advantage as catalysts. Salts of this type are for instance bismuth vanadate, copper vanadate or copper phosphate. It is sometimes advantageous to employ mixtures of any of the above mentioned substances. Very good results are obtained when ethylene is hydrated as described in the presence of mixtures of anhydrous tungstic acid and iron or iron oxide, or platinum or gold or copper or tantalum or bismuth vanadate. Mixtures of copper oxide and anhydrous tungsten oxide or copper vanadate are very suitable catalysts for the hydration of propylene.

The catalysts used according to our invention are preferably used in a finely divided state, for instance finely divided on a suitable carrier such as porous substances, e. g. silica gel, pumice stone, active carbon, phosphates, pyrophosphates, alum earths and the like.

The catalysts according to our invention may also be used together with small quantities of promotors.

The following examples serve to illustrate how our invention may be carried into effect.

1. A mixture of ethylene and water vapour is passed over a catalyst consisting of metallic platinum finely divided on granulated pumice stone at a temperature of about 150° C. About 15 to 20 per cent of the ethylene is converted. After condensation of the alcohol the mixture may again be passed over the catalyst for a further conversion into alcohol or the outflowing gases may be again conducted over the catalyst without previously removing the alcohol formed.

2. 5 grams of copper phosphate are mixed with water, while stirring to a pasty mass. To this mass 100 cc. of a porous stone, the grains of which have a diameter of about 2 mms. are added. While stirring, the mass is slowly dried and then placed in a tube, in which it is further dried at approximately 150° C. At a temperature of 155° C. and at a gas velocity of one quarter of a litre per hour ethylene is conducted over the catalyst prepared as stated above and a considerable portion thereof is converted into ethyl alcohol.

3. 15 grams of tungsten trioxide $WoO_3$ and 7.5 grams of ferric oxide are brought on to 150 grams of silica gel and reduced with hydrogen at 450° C. Over the mass thus obtained a mixture of ethylene and water vapour is conducted at 300° C. at a velocity of 6.7 ccs. per sec. per cc. of apparent catalyst space. The outflowing gases on condensation yield an aqueous alcohol solution. When carrying out the reaction at 400° C. the reaction products contain acetaldehyde and acetone.

4. A mixture of 15 grams of cupric oxide and 15 grams of tungsten trioxide $WoO_3$ is brought on to 150 grams of active carbon. Over this mass propylene and water vapour are conducted at a velocity of 6.7 ccs. per sec. per cc. of apparent catalyst space at 300° C. The outflowing gases on condensation yield aqueous propyl alcohol. If the temperature of the reaction is raised to 400° C. besides isopropyl alcohol a considerable quantity of acetone is also formed.

It is possible that, when working with the catalysts according to our invention, a certain amount of aldehydes or ketones may be formed, owing to the dehydrogenating action of the catalysts on the alcohols which are the chief product. By a suitable choice of gas velocity and temperature the formation of ketones and aldehydes may be promoted or avoided, as illustrated in Examples 3 and 4.

It should be observed that it is a highly important and new feature of the process according to this invention that it allows the manufacture of alcohols direct from olefines and water at ordinary pressure due to the high activity of the catalysts used. Up till now the hydration of olefines could only be effected under high pressure notwithstanding certain catalysts being employed, which of course made it necessary to use expensive apparatus and rendered the process uneconomical in comparison with the process of this invention which may be carried out under ordinary pressure.

It should be understood, however, that our invention is not limited to the application of normal pressure, but that also a higher pressure may be used, if desirable.

In consequence of the high activity of the catalysts which are employed according to our invention it is also possible to perform the reaction at a considerably lower temperature than usual in the hitherto known processes of this kind.

It should further be understood that our invention comprises the conversion of other olefines as well as ethylene such as propylene, butylene and the like and also the conversion of olefines containing two or more double bonds in the molecule into the corresponding alcohols.

What we claim is:

1. A method of manufacturing alcohols by hydrating the corresponding olefine having at least one double bond in the molecule, comprising combining the olefine with water in the vapor state at a temperature of at least 100° C. in the presence of a catalyst which consists of at least one heavy metal having a dehydrogenating action selected from the group consisting of the platinum metals, gold, silver, copper, iron, nickel, cobalt, chromium, tantalum, vanadium and tungsten.

2. A method as set forth in claim 1, in which the reaction is carried out at substantially atmospheric pressure.

3. A method of manufacturing alcohols by hydrating the corresponding olefine having at least one double bond in the molecule, comprising combining the olefine with water in the vapor state at a temperature of at least 100° C. in the presence of a catalyst which consists of a compound of a heavy metal having a dehydrogenating action selected from the group consisting of the platinum metals, gold, silver, copper, iron, nickel, cobalt, chromium, tantalum, vanadium and tungsten, which compound yields the metal under the conditions of the reaction.

4. Process for the manufacture of alcohols by hydrating the corresponding olefines having at least one double bond in the molecule in the presence of catalysts, comprising heating the olefine with water in the vapor state at a temperature between 100° C. and about 400° C. in the presence of a metal catalyst having a dehydrogenating and hydrating effect.

5. Process for the manufacture of alcohols by hydrating the corresponding olefines having at least one double bond in the molecule in the presence of catalysts, comprising heating the olefine with water in the vapor state at a temperature between 100° C. and about 400° C. in the presence of at least one metal having a dehydrogenating action selected from the group consisting of the platinum metals, gold, silver, copper, ( iron, nickel, cobalt, chromium, tantalum, vanadium and tungsten.

6. Process for the manufacture of alcohols by hydrating the corresponding olefines having at least one double bond in the molecule in the presence of catalysts, comprising heating the olefine with water in the vapor state at a temperature between 100° C. and about 400° C. in the presence of catalysts having a dehydrogenating action, containing principally at least one metal selected from the group consisting of the platinum metals, gold, silver, copper, iron, nickel, cobalt, chromium, tantalum, vanadium and tungsten.

7. A method of manufacturing alcohols by hydrating the corresponding olefine having at least one double bond in the molecule, comprising combining the olefine with water in the vapor state at a temperature between 100° C. and 400° C. in the presence of a catalyst which consists of a compound of a heavy metal having a dehydrogenating action selected from the group consisting of the platinum metals, gold, silver, copper, iron, nickel, cobalt, chromium, tantalum, vanadium and tungsten, which compound yields the metal under the conditions of the reaction.

8. Process for the manufacture of alcohols by hydrating the corresponding olefines having at least one double bond in the molecule in the presence of catalysts, comprising heating the olefine with water in the vapor state at a temperature between 100° C. and about 400° C. in the presence of catalysts having a dehydrogenating action, containing principally compounds of at least one metal selected from the group consisting of the platinum metals, gold, silver, copper, iron, nickel, cobalt, chromium, tantalum, vanadium and tungsten, and which compounds yield the metals under the reaction conditions.

ADRIANUS JOHANNES van PESKI.
SIEGFRIED LEONARD LANGEDIJK.